United States Patent [19]

Glessner et al.

[11] Patent Number: 4,815,779

[45] Date of Patent: Mar. 28, 1989

[54] METHOD AND APPARATUS FOR PART PICKUP

[75] Inventors: Charles W. Glessner, Washington Crossing; Paul A. Keenan, Newtown, both of Pa.

[73] Assignee: American Telephone and Telegraph Co., New York, N.Y.

[21] Appl. No.: 87,852

[22] Filed: Aug. 21, 1987

[51] Int. Cl.⁴ .................... B25J 15/06; B65G 47/91
[52] U.S. Cl. ................................ 294/64.1; 29/743
[58] Field of Search ............... 294/2, 64.1, 65.5, 88; 29/740, 743, 840; 269/21; 271/90, 91, 103; 279/3; 414/72, 121, 627, 737, 744 B, 752; 901/40

[56] References Cited

U.S. PATENT DOCUMENTS

| | | | |
|---|---|---|---|
| 3,918,144 | 11/1975 | Mimata et al. | 29/840 X |
| 4,381,601 | 5/1983 | Tamai et al. | 29/743 X |
| 4,451,976 | 6/1984 | Fujita et al. | 29/840 X |
| 4,600,228 | 7/1986 | Tarbuck | 294/64.1 |
| 4,703,965 | 11/1987 | Lee et al. | 294/64.1 |
| 4,728,135 | 3/1988 | Sugimura et al. | 294/64.1 |

FOREIGN PATENT DOCUMENTS 3102206 8/1982 Fed. Rep. of Germany ........ 29/743
2040681 1/1971 France .
1193921 6/1970 United Kingdom ............... 294/64.1

*Primary Examiner*—Johnny D. Cherry
*Attorney, Agent, or Firm*—Robert B. Levy

[57] ABSTRACT

A vacuum pickup tool (11), capable of picking up components (26) having a wide range in size and weight, comprises a body (12) having shaft (14) extending therefrom. The end of the shaft furthest from the body has an orifice (18) surrounded by a sealing surface (22) adapted for contact with a planar surface (24) on the component to form a substantially airtight seal therewith. A sleeve (30), having a rim (32) at the end thereof, is slidably carried by the shaft for movement thereon between a first and second position. At the first position of the sleeve, the sealing surface (22) at the end of the shaft extends beyond the rim (32) so that the sealing surface may contact the component, enabling a vacuum to be drawn over a first sized vacuum area on the surface of the component when the vacuum is drawn through the orifice. At the second position of the sleeve (30), the rim (32) extends beyond the sealing surface (22) for contacting the component surface (24) to enable a vacuum to be drawn over an area larger than the first vacuum area when a vacuum is drawn through the orifice (20).

7 Claims, 7 Drawing Sheets

METHOD AND APPARATUS FOR PART PICKUP

TECHNICAL FIELD

This invention relates to a method and apparatus for picking up components of different size and weight.

BACKGROUND ART

In the electronics industry, components having at least one planar surface are often handled by a vacuum pickup tool. The typical vacuum pickup tool comprises a shaft whose tip is provided with an orifice surrounded by a sealing surface. The sealing surface about the orifice, when brought into contact with the planar surface on the component, forms a substantially airtight seal therewith. When a partial vacuum is drawn through the orifice, a vacuum will be drawn over a portion of the area on the surface of the component. In this way, a force, referred to as a "vacuum" force, caused by a difference between the air pressure and partial vacuum, is exerted against the component which allows the component to be engaged by the vacuum pickup tool at a storage site. Once engaged, the component can then be transported for placement on a circuit board. By interrupting the vacuum drawn through the orifice, the component can be released from the vacuum pickup tool and the component can be thereafter bonded to the circuit board.

The magnitude of the vacuum force on the component varies with the size of the area (referred to as the vacuum area) on the planar surface of the component over which the vacuum is drawn. The size of the vacuum area varies directly with the size of the orifice, so that the larger the orifice, the heavier the component that can be engaged by the vacuum pickup tool. However, making the orifice larger than the area of the planar surface on the component prevents the formation of an airtight seal between the tool tip and the component which reduces magnitude of the force exerted on the component.

Presently, the range in the size and weight of the components to be handled is so wide as to preclude the use of a vacuum pickup tool having a single diameter orifice in its tip. In the past, this problem has been overcome by making the tip at the end of the vacuum pickup tool detachable. In this way, the tip can be interchanged with one having a different size orifice so as to permit components of a different size and weight to be engaged by the vacuum pickup tool. However, the interchange of tips requires either manual intervention or the addition of complex mechanical equipment to automatically change the tips, both alternatives being undesirable.

Thus, there is a need for a vacuum pickup tool which may be automatically adjusted in a convenient, simple manner to handle components of different size and weight.

BRIEF SUMMARY OF THE INVENTION

Briefly, the foregoing disadvantages are overcome by a pickup tool comprised of a body having a first orifice therein surrounded by a first surface adapted to form a seal with the planar surface on a component. Slidably mounted on the body is a member having a second orifice of a larger diameter than the first orifice. The second orifice in the member is surrounded by a second surface which is adapted to form a seal with the planar surface on the component. The member is movable on the body between a first position, at which the second orifice is distant from the first orifice, and a second position, at which the first and second orifices are proximate each other to readily communicate and at which the second surface extends outwardly beyond the first surface.

While the member is at the first position, the first surface about the first orifice is exposed for contacting the planar surface on the component. In this way, when at least a partial vacuum is drawn through the first orifice, a partial vacuum will be drawn over a first-sized vacuum area on the planar surface of the component, giving rise to a first vacuum force on the component. When the member has been displaced to the second position, then the second surface about the second orifice serves to contact the planar surface on the component. When a vacuum is now drawn through the first, and hence, the second orifice, the vacuum area on the surface of the component over which the vacuum is drawn is much larger than the first-sized vacuum area, giving rise to a larger vacuum force.

DETAILED DESCRIPTION

Figure 1:
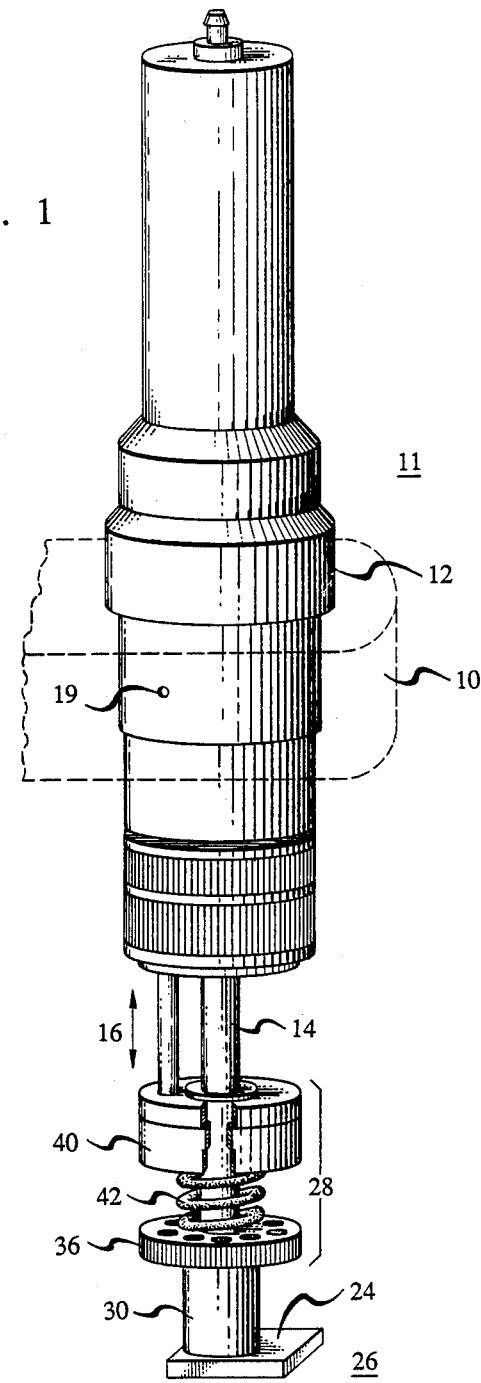
FIG. 1 shows a vacuum pickup tool, constructed in accordance with the present invention, carried by a robotic arm.

FIG. 1 shows a portion of a robotic arm 10 which is movable under operator control in a well-known manner. Attached to the arm 10 is a vacuum pickup tool 11 comprised of a cylindrical body 12 extending from which is a slidably mounted shaft 14. Means (not shown), in the form of an air cylinder or solenoid, are provided within the body 12 for extending and retracting the shaft 14 along a z axis, represented by a double-ended arrow 16.

Figure 2:
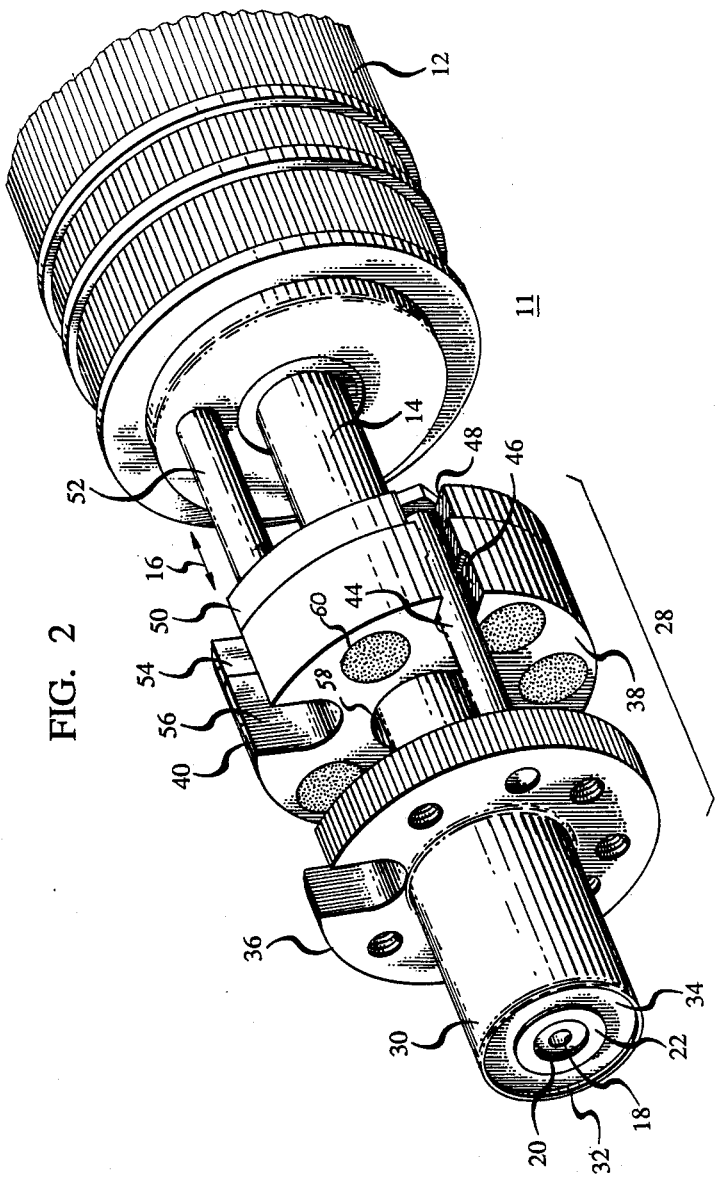
FIG. 2 shows the vacuum pickup tool of FIG. 1 in its first operating mode.
Figure 3:
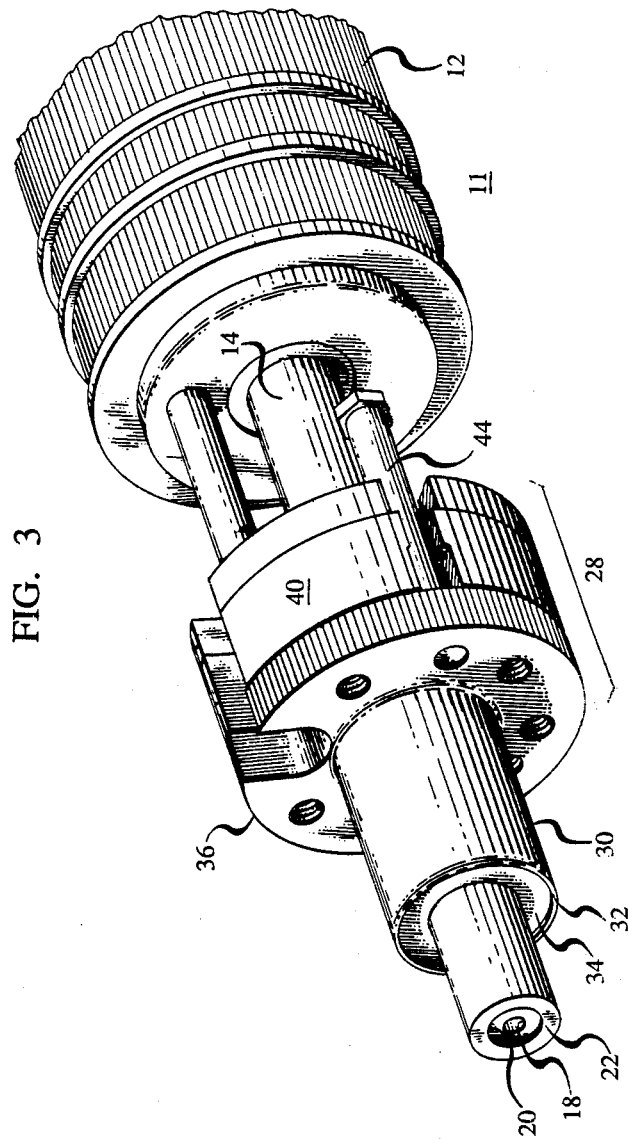
FIG. 3 shows the vacuum pickup tool of FIG. 1 in its second operating mode.

Referring to FIGS. 2 and 3, which show the vacuum pickup tool 11 in a horizontal orientation, the end of the shaft 14 distant from the body 12 has an opening 18 which communicates with a first end of a passage (not shown) extending through the shaft. The second end of the passage through the shaft 14 is coupled to a vacuum port 19 (see FIG. 1) on the body 12. The opening 18 communicates with an orifice or counter-bore 20 in the end of the shaft 14 which is circumscribed by a sealing surface 22. Referring to FIG. 1, the sealing surface 22 of FIG. 3 on the end of the shaft 14 is adapted for face-to-face contact with a planar surface 24 on a component 26 to enable the formation of a substantially airtight seal therebetween. As thus far described, the vacuum pickup tool 11 is conventional in its construction.

When the sealing surface 22 contacts the surface 24 on the component 26 of FIG. 1, the area on the component surface which registers with the orifice 20 of FIG. 2 is referred to as the vacuum area. The area is so named because the differential (vacuum) force exerted on the component 26 caused by drawing at least a partial vacuum through the port 19 (see FIG. 1) is proportional to such area. In practice, the size of the orifice 20 is selected to be small enough to assure the formation of a substantially airtight seal with planar surface 24 on the smallest size component 26 to be engaged by the vacuum pickup tool 11. As a result, the magnitude of the force exerted by the vacuum pickup tool 11 may be insufficient to pick up a component 26 of a much larger size and weight.

In accordance with the present invention, the vacuum pickup tool 11 is provided with an apparatus 28 carried by the shaft 14 for selectively increasing the effective vacuum area on the surface 24 of the component 26 over which the vacuum is drawn. The apparatus 28 comprises a sleeve 30 slidably mounted about the shaft 14 such that the clearance between the sleeve and the shaft is very small, on the order of 0.003", so that a substantially airtight seal exists therebetween. Referring to FIGS. 2 and 3, a rim 32 extends horizontally beyond the periphery of a first end 34 of the sleeve distant from the body 12. The protruding rim 32 creates an orifice in the end 34 of the sleeve 30 which communicates with the orifice 22 when the sleeve is positioned on the shaft 14 such that the rim extends beyond the sealing surface 22 as seen in FIG. 2. Under these circumstances, the rim 32, rather than the sealing surface 22, is positioned for contact with the planar surface 24 of the component 26 (both of FIG. 1). When the rim 32, rather than the sealing surface 22, contacts the surface 24, the overall size of the vacuum area over which the vacuum force is exerted, when at least a partial vacuum is drawn through the orifice 20, is now greater. Hence, for a given level of vacuum drawn through the vacuum port 19 of FIG. 1, the vacuum force exerted on the component 26 is now larger.

A ferromagnetic flange 36 is integrated to the end of the sleeve 30 opposite the end 34. The flange 36 is adapted for face-to-face contact with a first end 38 (see FIG. 2) of an annulus 40 fixedly mounted to the shaft 14 so as to remain a set distance from the body 12 when the shaft has been retracted as far as possible into the body. As seen in FIG. 1, the flange 36 is biased from the annulus 40 by a compression spring 42 carried on the shaft 14.

Referring to FIGS. 2 and 3, the separation of the flange 36 from the annulus 40 is limited by a pair of bolts 44, each threaded into the flange. Each of the bolts 44 extends through a separate one of a pair of aligned passages 46 and 48 in the annulus 40 and in a backlash plate 50, respectively, the backlash plate being rotatably attached to the end of the annulus opposite the end 38. By rotating the backlash plate 50, the degree to which the plate binds against the bolts 44 may be adjusted to limit the degree to which the sleeve 30 may rotate relative to the annulus 40. Rotation of the annulus 40 relative to the body 12 is limited by a rod 52 affixed to, and extending from, the body parallel to the shaft 14 for receipt in each of a pair of aligned passages 54 and 56 in the backlash plate 50 and the annulus, respectively.

The length of the bolts 44 and the length of the spring 42 are selected such that while the spring remains extended, the head of each bolt abuts the backlash plate 50. As seen in FIG. 2, under these conditions the flange 36 remains spaced from the annulus end 38 such that the rim 32 on the sleeve end 34 extends outwardly beyond the sealing surface 22. While the rim 32 projects beyond the sealing surface 22, the vacuum pickup tool 11 is said to be operating in a first mode. While the vacuum pickup tool 11 operates in the first mode, the effective vacuum area on the surface 24 of the component 26 engaged by the tool is the size of the area bounded by the rim 32. As may be appreciated, the area on the surface 34 bounded by the rim 32 is larger than that bounded by the sealing surface 22 on the shaft 14, giving rise to a larger vacuum area.

When the sleeve 30 is displaced along the shaft 14 so that the flange 36 compresses the spring 42, the sealing surface 22 can be exposed for contact with the surface 24 of the component 26 of FIG. 1. Referring to FIG. 2, to enable the flange 36 to abut the end of 38 of the annulus 40 while the spring 42 is compressed, a counterbore 58 is provided in the annulus end to receive the nowcompressed spring. Further, the end 38 of the annulus 40 has a plurality of magnets 60 embedded therein which are of sufficient strength to maintain the flange 36 latched against the annulus while the spring 42 is compressed.

Referring to FIG. 3, while the flange 36 is latched against the annulus 40 so that the sealing surface 22 remains extended beyond the rim 32, the vacuum pickup tool 11 is said to be operating in a second mode. The second operating mode of the vacuum pickup tool 11 is the conventional mode of operation whereby the sealing surface 22 at the end of the shaft 14 serves to contact the surface 24 of the component 26 of FIG. 1. When operated in the second mode, the vacuum pickup tool 11 can pick up smaller-sized components that when operated in the first mode.

Figure 4:
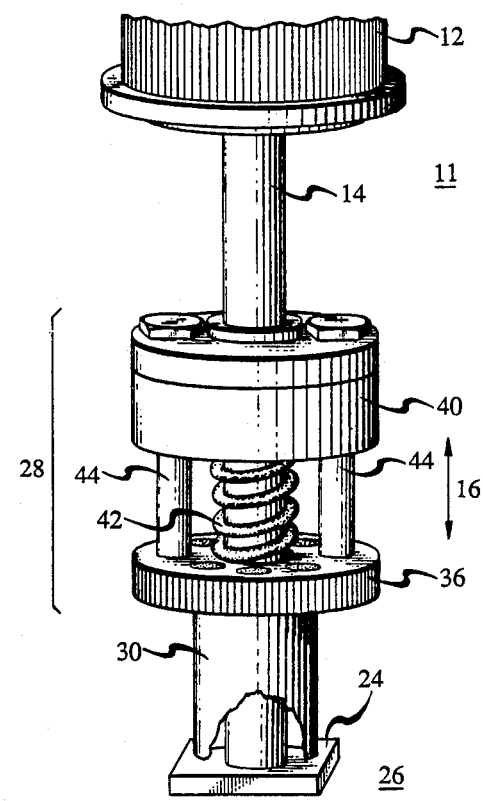
FIGS. 4–7 show the sequence of operations that are performed to switch the vacuum pickup tool from its first to its second operating mode and vice versa.
Figure 5:
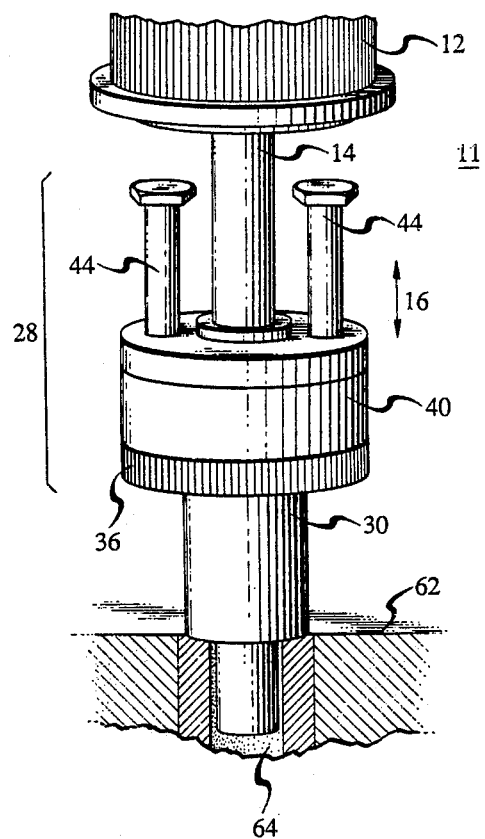

FIGS. 4-7 illustrate in sequence how the operating mode of the vacuum pickup tool 11 may be automatically changed without operator intervention. FIG. 4 shows the vacuum pickup tool 11 in the first operating mode, with the shaft 14 fully extended from the body 12. Referring to FIG. 5, to switch the vacuum pickup tool 11 to the second operating mode, the tool is displaced by the robotic arm 10 (see FIG. 1) towards a work surface 62 to insert the shaft 14 into a passage 64 sized smaller than the diameter of the sleeve 30 but larger than the shaft. As the shaft 14 enters the passage 64, the flange 36 is yieldably urged against the spring 42 (see FIGS. 1 and 4) and into abutment with the annulus 40 so as to be latched thereagainst by the magnets 60 (see FIG. 2).

Figure 6:
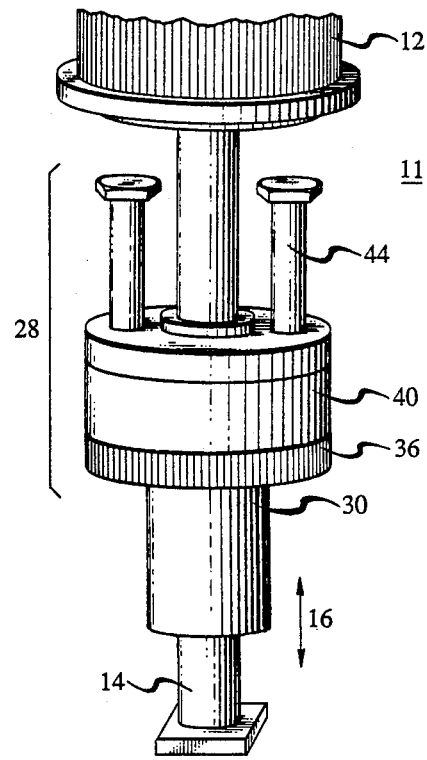

Once the flange 36 has been latched against the annulus 40, the vacuum pickup tool is now operating in the second mode. As seen in FIG. 6, when the vacuum pickup tool 11 is operating in the second mode, the end of the shaft 14 now projects beyond the end of the sleeve 30. Hence the sealing surface 22 (see FIGS. 2 and 3) is now exposed and can thus contact a component 26 whose planar surface 24 is of an area smaller than that circumscribed by the rim 32 of FIGS. 2 and 3.

Figure 7:
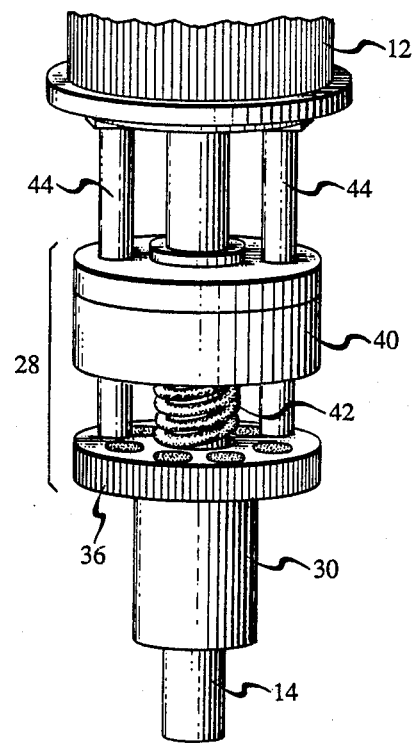

Referring to FIG. 7, to switch the vacuum pickup tool 11 to the first operating mode, the shaft 14 is retracted into the body 12, causing the head of each bolt 44 to come into contact with the body. The bolts 44, and hence the flange 36, are now prevented from any further movement so that as the shaft 14 continues to be retracted, the annulus 40 separates from the flange, breaking the magnetic bond therebetween. Once the magnetic bond between the flange 36 and the annulus 40 is broken, the spring 42 keeps the flange biased from the annulus such that the rim 32 (see FIGS. 2 and 3) protrudes beyond the sealing surface 22 (see FIGS. 2 and 3.). The vacuum pickup tool 11 is now once again operating in the first mode.

As may be appreciated, the above described steps can be performed automatically by appropriately controlling the movement of the robotic arm 10 of FIG. 1 and the retraction of the shaft 12. In this way, the vacuum pickup tool 11 can be switched between the first operating mode, which allows large size components 26 to be engaged by the tool, and the second operating mode, which permits small size components to be engaged, without operator intervention and without any complex mechanical equipment.

It is to be understood that the embodiments described herein are merely illustrative of the principles of the invention. Various modifications and changes may be made thereto by persons skilled in the art which will embody the principles of the invention and fall within the spirit and scope thereof.

What is claimed is:

1. A vacuum pickup tool comprising:
   a body having an orifice therein surrounded by a sealing surface adapted to contact a planar surface on a component to form a substantially airtight seal therewith so that when a vacuum is drawn through said orifice, a vacuum will be drawn over a first-sized area on the component surface, characterized in that:
   a member, having a passage therethrough larger than said orifice, and surrounded by a second sealing surface, is slidably mounted to said body for selective movement thereon between a first position, at which said passage in said member is distant from said orifice, and a second position at which said passage communicates with said orifice and at which said second sealing surface extends beyond said first sealing surface for contact with the planar surface of the component to form a substantially airtight seal therewith; and
   means are provided for releasably latching said member to said body while said member is at said first position.

2. The apparatus according to claim 1, characterized in that a spring yieldably biases said member on said body towards said second position.

3. A vacuum pickup tool comprised of a housing having an outwardly extending shaft whose end distant from the housing has an orifice therein surrounded by a sealing surface adapted to contact a planar surface on a component to form a substantially airtight seal therewith, so when a vacuum is drawn through said orifice, a vacuum will be drawn over a first-sized vacuum area on the surface of the component, characterized by an apparatus carried on said shaft for selectively increasing the effective size of the vacuum area on the component surface, said apparatus including:
   an annulus fixedly mounted to the shaft so as to be spaced from said housing and from the sealing surface at the end of said shaft;
   a sleeve slidably mounted about the shaft for movement therealong between a first position at which a first end of said sleeve extends outwardly beyond the sealing surface at the end of the shaft and a second position at which the sealing surface extends outwardly beyond the sleeve first end;
   said sleeve having a ferromagnetic flange integral with its end closest to said annulus and having a rim integral with and extending out from the other end of the sleeve so as to be spaced outside of said sealing surface for cooperating with the planar surface on the component to form a substantially airtight seal therewith while said sleeve is at said first position, so that when a vacuum is drawn through said orifice in said shaft, a vacuum will be drawn over a vacuum area larger than said first-sized vacuum area;
   a spring interposed between said flange on said sleeve and said annulus for yieldably biasing said sleeve towards said first position;
   a pair of bolts having a first end threaded into said flange and extending therefrom through each of a pair of passages in said annulus, said bolts each having a head at its opposite said first end, the head of each bolt protruding a predetermined distance from said annulus when said flange is biased against the spring so as to make face-to-face contact with said annulus; and
   a plurality of magnets embedded in an end of said annulus closest to said flange for releasably latching said flange to said annulus.

4. A method for picking up and placing a component on a substrate to fabricate an article, comprising the steps of:
   drawing at least a partial vacuum through an orifice surrounded by a first sealing surface on a vacuum tool to draw the vacuum over at least a first sized vacuum area on a planar surface of a component in contact with the sealing surface;
   displacing the vacuum tool to place the component on the susbtrate; and
   releasing the vacuum to release the component, characterized in that:
   a member, having a passage therethrough surrounded by a second sealing surface larger than the first surface, is normally maintained in latched engagement with the vacuum tool at a first position at which the passage in the member is distant from the orifice; and
   prior to the vacuum drawing step, the member is selectively delatched and displaced from the first position to a second position at which the passage in the member communicates with the orifice in the tool and at which the second sealing surface projects beyond the first sealing surface for contacting the planar surface with the component to form a seal therewith which encloses a second vacuum area larger than the first vacuum area to cause a force, larger than that created by drawing the vacuum over the first vacuum area, to be exerted on the component.

5. The method according to claim 4, characterized in that following the release of the component, the member is displaced from the second position to the first position and is thereafter latched to the vacuum pickup tool.

6. The method according to claim 5, characterized in that following the latching of the member, the drawing, displacing and releasing steps are repeated to place another component on the substrate.

7. The method according to claim 4, characterized in that following the selective de-latching and displacement of the member, the drawing, displacing and releasing steps are repeated to place another component on the substrate

* * * * *